July 31, 1923.
P. G. HEAGERTY
WAVING SIGNAL
Filed Oct. 6, 1922
1,463,650
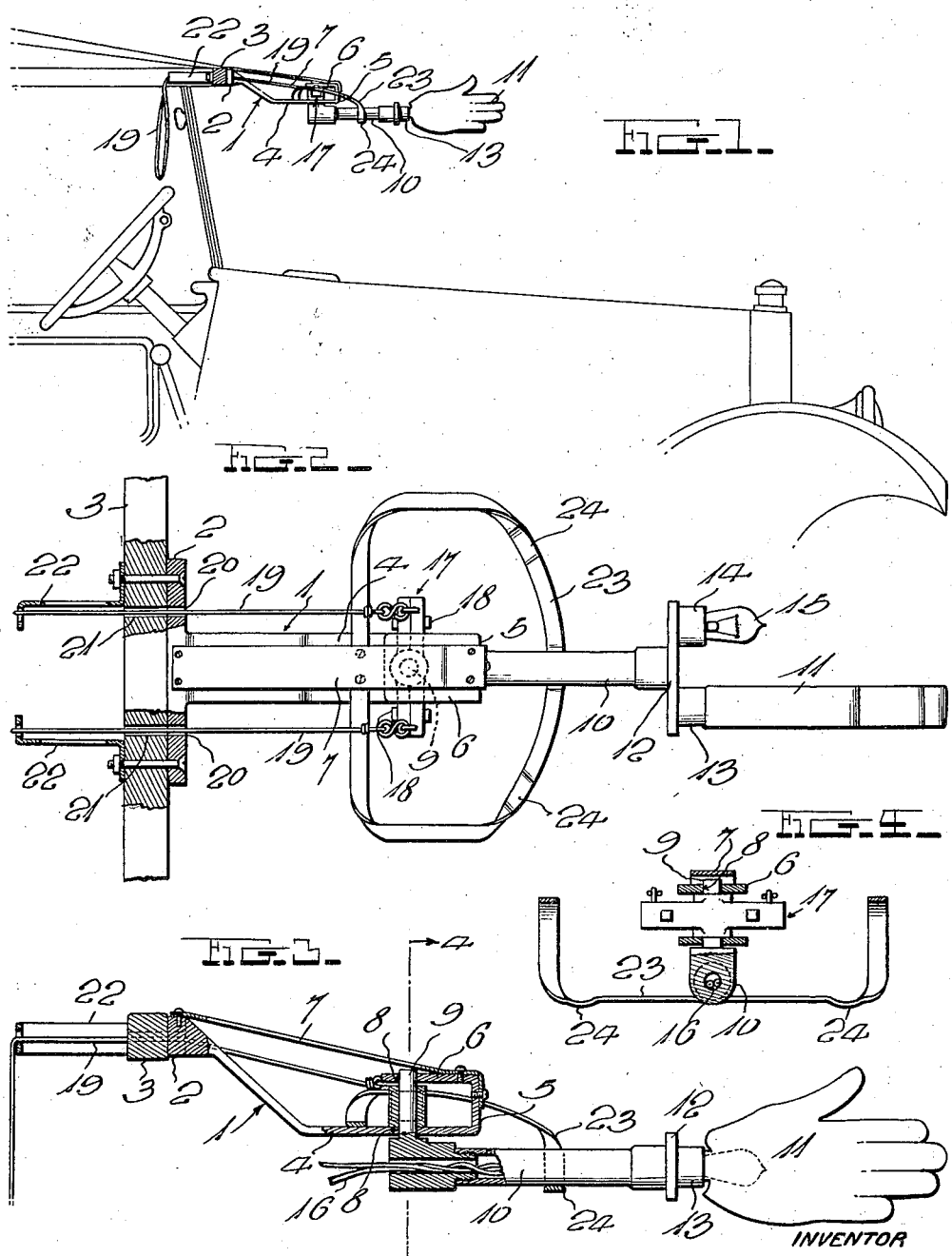

Patented July 31, 1923.

1,463,650

UNITED STATES PATENT OFFICE.

PATRICK G. HEAGERTY, OF SANDUSKY, OHIO.

WAVING SIGNAL.

Application filed October 6, 1922. Serial No. 592,396.

*To all whom it may concern:*

Be it known that I, PATRICK G. HEAGERTY, a citizen of the United States, residing at Sandusky, in the county of Erie and State of Ohio, have invented certain new and useful Improvements in Waving Signals; and I do declare the following to be a full, clear, and exact description of the invention, such as will enable others skilled in the art to which it appertains to make and use the same.

My invention relates to improvements in signalling devices for attachment to automobiles and other vehicles to give the required signals when the machine is to be turned in either direction or stopped, the principal object being to provide a simple and inexpensive, yet a reliable and easily operated device of the character set forth.

In carrying out my invention, I mount a horizontally swinging signal arm on the front end of a bracket arm which extends forwardly from the front bow of the automobile top or from any other desired part, a further object being to provide novel means for swinging the arm in one direction or the other and for holding it at any position at which it may be set.

With the foregoing in view, the invention resides in the novel subject matter hereinafter described and claimed, the description being supplemented by the accompanying drawing.

Figure 1 is a side elevation of my invention attached to an automobile.

Figure 2 is a top plan view partly in horizontal section.

Figure 3 is substantially a central vertical longitudinal section.

Figure 4 is a vertical transverse section on line 4—4 of Fig. 3.

In the drawing above briefly described, the numeral 1 designates a supporting bracket which is preferably of T-shape in plan view, the head 2 of said bracket being designed for bolting against a suitable support, such as the front bow 3 of an automobile top. The rear end portion of the forwardly extending shank or arm of the bracket 1 may well decline forwardly as shown in Figs. 1 and 3, but the front end of this arm is preferably horizontal as indicated at 4, the forward extremity of this front end being bent upwardly at 5 and rearwardly as indicated at 6. A brace 7 connects the portion 6 with the head 2 to prevent possible sagging of the front end of the bracket.

The portion 6 of the bracket arm and part of said arm immediately under said portion, are provided with vertically alined openings 8 which rotatably receive an upright shaft 9 whose lower end carries a tubular signal arm 10, the front end of this arm being provided with any suitable indicator, such as a simulation 11 of a human hand. Any suitable provision may be made for illuminating this indicator at night but the construction shown is preferably followed. A cross arm 12 is mounted on the front end of the arm 10 and is provided with two sockets 13 and 14, the indicator 11 being threaded in one of said sockets while an electric bulb 15 is threaded in the other and may be supplied with current by suitable wires 16 extending through the arm 10.

A two-part cross arm 17 is clamped by bolts or the like 18, around the shaft 9 and rests upon the horizontal part 4 of the forwardly extending bracket arm, whereby to support the shaft 9 and the arm 10 carried thereby. A pair of cords or other suitable lines 19 extend rearwardly from the opposite ends of the arm 17, so that by pulling one cord or the other, the signalling arm 10 may be swung in the desired direction. The cords 19 are preferably passed through guide openings 20 in the bracket head 2, through similar openings 21 in the bow 3, and are engaged with suitable supporting arms 22 which extend rearwardly from said bow, to position the depending ends of the cords in easy reach of the driver, these ends being preferably connected as shown.

For the purpose of holding the arm 10 in any position at which it may be set, I make use of a strip of spring metal 23 bent into the form of an open frame in plan view, the rear side of said frame being secured to the end 4 of the bracket arm, while the front bar of said frame yieldably engages the lower side of the arm 10 and is provided with a plurality of depressions 24, into which the arm 10 snaps, when swung to any position.

By employing the simple construction shown and described, a very advantageous device is provided and it will be obvious that the article may be inexpensively manufactured and marketed. As excellent results may be obtained from the details disclosed, they may be followed if desired, but it is to be understood that within the scope of the invention as claimed, numerous minor changes may be made.

I claim:

1. A vehicle signal comprising an arm adapted to be secured to and to extend forwardly from a portion of a vehicle, said arm having a bearing opening, an upright stub shaft rotatable in said bearing opening, a signal arm carried by said shaft, a cross arm secured to and extending in opposite directions from said shaft, and lines connected with and extending rearwardly from the ends of said cross arm for operating said shaft and the signal arm.

2. A vehicle signal comprising a bracket arm adapted to be secured to and to extend forwardly from a portion of a vehicle, the front end of said bracket arm having vertically spaced portions provided with vertically alined bearing openings, a stub shaft rotatable in said bearing openings, a signal arm carried by the lower end of said stub shaft and positioned under said bracket arm, a cross arm secured on said shaft between said vertically spaced portions of said bracket arm, and a pair of lines secured to and extending rearwardly from the ends of said cross arm.

3. A vehicle signal comprising a bracket arm adapted to be secured to and to extend forwardly from a portion of a vehicle, the front end of said bracket arm being bent upwardly and rearwardly and having vertically alined bearing openings in its vertically spaced portions, a shaft rotatable in said bearing openings, a signal arm carried by said shaft under said bracket arm, a cross arm secured on said shaft between said vertically spaced portions of said bracket arm, and lines extending rearwardly from the ends of said cross arm for operating the same.

4. A vehicle signal comprising a bracket adapted to be secured to a portion of a vehicle, a horizontally swinging signal arm mounted on said bracket, and a spring metal strip mounted on said bracket and extending transversely of said signal arm, said spring metal strip engaging said signal arm and having a plurality of seats for receiving said arm and retaining the same in adjusted positions.

5. A vehicle signal comprising a bracket for attachment to a vehicle, a horizontally swinging arm mounted on said bracket, and a strip of spring metal bent into the form of an open frame in plan view, one side of the frame being secured to said bracket while the opposite side thereof yieldably engages said signal arm and is provided with seats to yieldably hold said arm in adjusted positions.

In testimony whereof I have hereunto affixed my signature.

PATRICK G. HEAGERTY.